United States Patent
Kawata et al.

(10) Patent No.: US 10,386,826 B2
(45) Date of Patent: Aug. 20, 2019

(54) START-UP CONTROL DEVICE AND START-UP CONTROL METHOD FOR POWER PLANT

(71) Applicant: Mitsubishi Hitachi Power Systems, Ltd., Nishi-ku, Yokohama (JP)

(72) Inventors: Miyuki Kawata, Tokyo (JP); Yasuhiro Yoshida, Tokyo (JP); Takuya Yoshida, Tokyo (JP); Tatsuro Yashiki, Tokyo (JP); Eunkyeong Kim, Tokyo (JP); Kazunori Yamanaka, Yokohama (JP); Norihiro Iyanaga, Yokohama (JP); Atsushi Yamashita, Yokohama (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 475 days.

(21) Appl. No.: 15/215,915

(22) Filed: Jul. 21, 2016

(65) Prior Publication Data

US 2017/0023933 A1    Jan. 26, 2017

(30) Foreign Application Priority Data

Jul. 23, 2015    (JP) ................. 2015-146125

(51) Int. Cl.
  *G05B 19/418*    (2006.01)
  *F01K 13/02*     (2006.01)
  *G05F 1/66*      (2006.01)

(52) U.S. Cl.
  CPC ........ *G05B 19/41865* (2013.01); *F01K 13/02* (2013.01); *G05F 1/66* (2013.01); *G05B 2219/31334* (2013.01)

(58) Field of Classification Search
  CPC .... G05B 19/41865; G05B 2219/31334; F01K 13/02; G05F 1/66

(Continued)

(56) References Cited

U.S. PATENT DOCUMENTS

| 4,280,060 A | 7/1981 | Kure-Jensen et al. |
| 2005/0246039 A1* | 11/2005 | Iino ..................... G05B 13/042 700/29 |

(Continued)

FOREIGN PATENT DOCUMENTS

| EP | 2 871 333 A1 | 5/2015 |
| JP | 2-181001 A   | 7/1990 |

(Continued)

OTHER PUBLICATIONS

Extended European Search Report issued in counterpart European Application No. 16180610.4 dated Jan. 4, 2017 (seven (7) pages).

*Primary Examiner* — Robert A Cassity
(74) *Attorney, Agent, or Firm* — Crowell & Moring LLP

(57) ABSTRACT

To provide a start-up control device and a start-up control method for a power plant capable of changing the start-up completion estimated time to a desired time simply and safely while starting the power plant. The start-up control device includes an equipment state quantity acquisition unit acquiring an equipment state quantity of the power plant, a start-up schedule calculation unit calculating a current start-up schedule based on the equipment state quantity and a first thermal stress limiting value and calculating a start-up schedule changing plan based on the equipment state quantity and a second thermal stress limiting value, an equipment operation amount calculation unit calculating an equipment operation amount of the power plant based on the current start-up schedule, a screen display unit displaying respective start-up completion estimated times of the current start-up schedule and the start-up schedule changing plan, and an instruction input unit instructing the start-up schedule calculation unit to perform switching from the current start-up schedule to the start-up schedule changing plan.

14 Claims, 15 Drawing Sheets

(58) Field of Classification Search
USPC .......................................................... 700/287
See application file for complete search history.

(56) References Cited

U.S. PATENT DOCUMENTS

| | | | | |
|---|---|---|---|---|
| 2006/0233637 | A1* | 10/2006 | Yakushi | ................. F01D 17/00 |
| | | | | 415/13 |
| 2011/0071692 | A1* | 3/2011 | D'Amato | ............... G05B 17/02 |
| | | | | 700/291 |
| 2015/0121872 | A1* | 5/2015 | Yashiki | ................... F22B 35/00 |
| | | | | 60/646 |
| 2015/0135712 | A1* | 5/2015 | Kim | ....................... F01K 13/02 |
| | | | | 60/660 |

FOREIGN PATENT DOCUMENTS

| | | |
|---|---|---|
| JP | 2009-30476 A | 2/2009 |
| JP | 2015-96718 A | 5/2015 |

\* cited by examiner

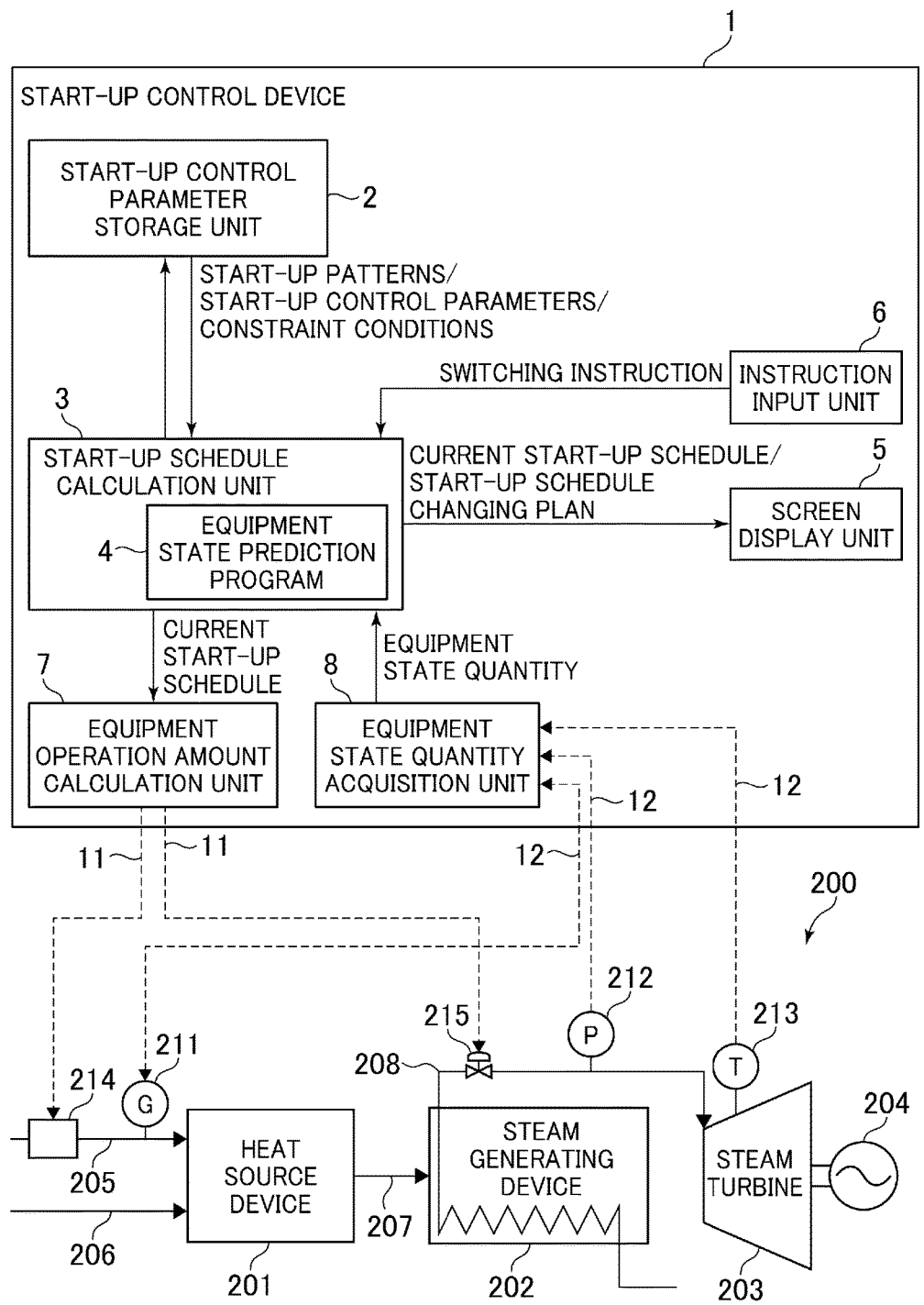

FIG.3

| SCHEDULE | START-UP COMPLETION ESTIMATED TIME | SELECTION |
|---|---|---|
| CURRENT | 6/20 12:00 (120 MINUTES LATER) | RUNNING |
| CHANGING PLAN A | 6/20 11:50 (110 MINUTES LATER) | SELECT ~51 |
| CHANGING PLAN B | 6/20 11:40 (100 MINUTES LATER) | SELECT ~52 |

FIG.5

| SCHEDULE | LIFETIME CONSUMPTION RATE [%] | START-UP COMPLETION ESTIMATED TIME | SELECTION |
|---|---|---|---|
| CURRENT | 0.024 | 6/20 12:00 (120 MINUTES LATER) | RUNNING |
| CHANGING PLAN A | 0.078 | 6/20 11:50 (110 MINUTES LATER) | SELECT —51 |
| CHANGING PLAN B | 0.140 | 6/20 11:40 (100 MINUTES LATER) | SELECT —52 |

FIG.7

| SCHEDULE | RESIDUAL NUMBER OF START-UP TIMES IN CURRENT YEAR/ EXCESS LIFETIME CONSUMPTION RATE | | START-UP COMPLETION ESTIMATED TIME | SELECTION |
|---|---|---|---|---|
| | ○ HOT<br>● WARM<br>○ OLD | EXCESS LIFETIME CONSUMPTION RATE [%pt] | | |
| CURRENT | 15 | 0.001 | 6/20 12:00<br>(120 MINUTES LATER) | RUNNING |
| CHANGING PLAN A | 15 | 0.022 | 6/20 11:50<br>(110 MINUTES LATER) | SELECT |
| CHANGING PLAN B | 14 | 0.002 | 6/20 11:40<br>(100 MINUTES LATER) | SELECT |

FIG.8

| SCHEDULE | FUEL CONSUMPTION AMOUNT TO BE USED UNTIL START-UP COMPLETION [ton] | START-UP COMPLETION ESTIMATED TIME | SELECTION |
|---|---|---|---|
| CURRENT | 18 | 6/20 12:00 (120 MINUTES LATER) | RUNNING |
| CHANGING PLAN A | 16 | 6/20 11:50 (110 MINUTES LATER) | SELECT ~51 |
| CHANGING PLAN B | 16 | 6/20 11:40 (100 MINUTES LATER) | SELECT ~52 |

FIG.12

| SCHEDULE | START-UP COMPLETION ESTIMATED TIME | THERMAL STRESS LIMITING VALUE [N/mm²] | SELECTION | |
|---|---|---|---|---|
| CURRENT | 6/20 12:00 (120 MINUTES LATER) | 30 | RUNNING | |
| CHANGING PLAN | 6/20 11:39 (99 MINUTES LATER) | 35 | CALCULATE | DETERMINE |

FIG.14

| SCHEDULE | START-UP COMPLETION ESTIMATED TIME | LIFETIME CONSUMPTION RATE [%] | SELECTION | |
|---|---|---|---|---|
| CURRENT | 6/20 12:00 (120 MINUTES LATER) | 0.024 | RUNNING | |
| CHANGING PLAN | 6/20 11:35 | | CALCULATE | DETERMINE |

FIG.15

| SCHEDULE | START-UP COMPLETION ESTIMATED TIME | LIFETIME CONSUMPTION RATE [%] | SELECTION | |
|---|---|---|---|---|
| CURRENT | 6/20 12:00 (120 MINUTES LATER) | 0.024 | RUNNING | |
| CHANGING PLAN | 6/20 11:35 (95 MINUTES LATER) | 0.159 | CALCULATE | DETERMINE |

START-UP CONTROL DEVICE AND START-UP CONTROL METHOD FOR POWER PLANT

BACKGROUND OF THE INVENTION

Field of the Invention

The present invention relates to a start-up control device and a start-up control method for a power plant having a steam turbine.

Description of Related Art

Starting time of a steam turbine power plant is required to be further reduced for stabilizing the system power connecting to renewable energy represented by wind power generation or solar power generation and for cutting fuel costs and reducing environmental load.

As the temperature and the flow rate of steam are rapidly increased at the time of starting the steam turbine, the surface of a turbine rotor is increased in temperature as compared with the inside thereof and a temperature gradient in a radial direction is increased, as a result, thermal stress is increased. If low-cycle thermal fatigue accumulated in the turbine rotor due to the thermal stress exceeds a limit value of a material of the turbine rotor, a crack can occur in the turbine rotor. The low-cycle thermal fatigue accumulated in the turbine rotor during each start-stop cycle can be defined by a decrement of a turbine rotor lifetime due to thermal stress, that is, a lifetime consumption rate (LC). Here, the lifetime consumption rate will be 100% when the crack can occur in the turbine rotor due to the low-cycle thermal fatigue.

There is a fixed correlation between a peak value ($\sigma$max) of thermal stress generated in one start-up and the lifetime consumption rate (LC) of the turbine rotor by the start-up. When a stop time of the steam turbine becomes long, the temperature inside the turbine rotor is reduced by natural cooling. As a result, the thermal stress at the time of start-up is increased, and the lifetime consumption rate is increased accordingly. Therefore, it is necessary to suppress the increase of thermal stress by increasing the starting time for suppressing the increase of the lifetime consumption rate.

When the power plant starts operation, the annual number of start-up times and a standard lifetime consumption rate per one start-up (a planned value of the lifetime consumption rate) in a current year are determined such that an integrated value of the lifetime consumption rate does not exceed 100% within the number of operation years of the power plant, and a thermal stress limiting value is set based on the planned value of the lifetime consumption rate.

The start-up control of the power plant is executed based on a predetermined start-up schedule. The start-up schedule includes start-up control parameters such as boiler ignition, steam turbine start-up, turbine speed-up, heat soak, load increase, start time of load retention and a turbine rotational speed increase rate, a generator output increase rate, heat soak time and load retention time from the beginning of start-up until reaching a target load, which are set such that the peak value of thermal stress during start-up does not exceed the thermal stress limiting value.

As related-art techniques relating to the control method of power plant, there are techniques described in JP-A-2009-30476 (Patent Document 1) and JP-A-2-181001 (Patent Document 2).

According to a method and a system for optimizing operation of a power plant disclosed in Patent Document 1, in a multipurpose optimization problem of calculating an operation amount at the time of operating the power plant so as to satisfy constraint conditions of both or one of the operation limiting values of respective apparatuses of the power plant and an environmental regulation value of the plant in consideration of target functions as plural evaluation indexes, repeated calculation due to experience or trial and error by a decision maker who is an engineer or an operator can be reduced as well as the optimum operation amount which can satisfy the decision maker can be calculated in a short period of time.

Furthermore, according to a starting operation support system for a thermal power plant disclosed in Patent Document 2, it is possible to create a start-up schedule capable of accurately keeping a start-up completion time (combining time or target load reaching time) and suppressing thermal stress which is the most important operation constraint condition at the time of starting the turbine within a prescribed value to thereby shorten a necessary time for starting (abbreviated to as a starting time) to the minimum. Even when schedule slips due to unexpected factors such as occurrence of abnormality, a schedule as close to the original schedule as possible can be created after the factor is solved based on the prediction of thermal stress of the turbine, therefore, the slippage of start-up completion time can be suppressed as small as possible.

SUMMARY OF THE INVENTION

As described in the description of related arts, the starting time of the power plant and the thermal stress peak value generated in the turbine rotor during the start-up are in the relationship of trade-off, therefore, the thermal stress peak value during the start-up may exceed the thermal stress limiting value when the starting time is made to be shorter than the original plan. Here, the thermal stress limiting value is a constraint condition provided for securing the number of operation years of the power plant, therefore, even when the thermal stress peak value during start-up exceeds the thermal stress limiting value, damage affecting functions or safety of the steam turbine does not occur, and the lifetime consumption rate is just increased earlier than the original plan. Accordingly, for example, when power demand is tight during the start-up of the power plant, a disadvantage occurring due to the delay of start-up is higher than an advantage obtained by keeping the thermal stress limiting value, which requires change of a start-up completion estimated time to a desired time during start-up.

However, it is difficult to change the start-up completion estimated time to the desired time while starting the power plant by the methods of starting control disclosed in Patent Document 1 and Patent Document 2.

The present invention has been made in view of the above circumstances, and on object thereof is to provide a start-up control device and a start-up control method for a power plant capable of changing the start-up completion estimated time to a desired time simply and safely while starting the power plant.

According to the embodiment of the present invention, there is provided a start-up control device for a power plant having a steam turbine, which includes an equipment state quantity acquisition unit acquiring an equipment state quantity of the power plant, a start-up schedule calculation unit calculating a current start-up schedule based on the equipment state quantity and a predetermined first constraint condition and calculating a start-up schedule changing plan based on the equipment state quantity and a predetermined second constraint condition, an equipment operation amount calculation unit calculating an equipment operation amount of the power plant based on the current start-up schedule, a screen display unit displaying start-up completion estimated times with respect to the current start-up schedule and the start-up schedule changing plan respectively and an instruction input unit outputting an instruction for switching from the current start-up schedule to the start-up schedule changing plan to the start-up schedule calculation unit in accordance with an input operation by an operator.

According to the present invention, the start-up completion estimated time can be changed to a desired time simply and safely during the start-up of the power plant, therefore, the operator can flexibly deal with changes in power demand and the like during the start-up of the power plant.

BRIEF DESCRIPTION OF THE DRAWINGS

FIG. 1 is a schematic configuration diagram of a start-up control device according to a first embodiment of the present invention;

FIG. 3 is an image showing an example of a start-up schedule selection screen displayed on a screen display unit according to the first embodiment of the present invention;

FIG. 5 is an image showing an example of a start-up schedule selection screen displayed on the screen display unit according to a second embodiment of the present invention;

FIG. 7 is an image showing an example of a start-up schedule selection screen displayed on the screen display unit according to a third embodiment of the present invention;

FIG. 8 is an image showing an example of a start-up schedule selection screen displayed on the screen display unit according to a fourth embodiment of the present invention;

FIG. 12 is an image showing an example of a start-up schedule selection screen (after calculating the start-up schedule changing plan) displayed on the screen display unit according to the sixth embodiment of the present invention;

FIG. 14 is an image showing an example of a start-up schedule selection screen (before calculating the start-up schedule changing plan) displayed on the screen display unit according to the seventh embodiment of the present invention; and FIG. 15 is an image showing an example of a start-up schedule selection screen (after calculating the start-up schedule changing plan) displayed on the screen display unit according to the seventh embodiment of the present invention.

DESCRIPTION OF EMBODIMENTS

Figure 2A:
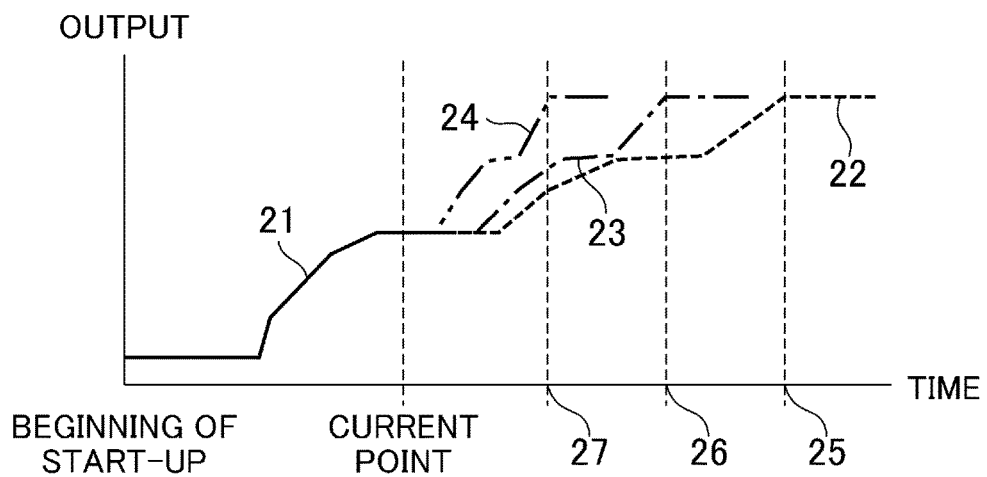
FIGS. 2A and 2B are graphs showing respective output curves and thermal stress curves of a current start-up schedule and start-up schedule changing plans according to the first embodiment of the present invention.

Hereinafter, embodiments of the present invention will be explained with reference to the drawings. The same symbols are given to the same components in respective drawings, and repeated explanation is suitably omitted.

First Embodiment

FIG. 1 is a schematic configuration diagram of a steam turbine power plant (hereinafter referred to merely as a "power plant") according to a first embodiment of the present invention.

In FIG. 1, a power plant 200 includes a heat source device 201, a steam generating device 202, a steam turbine 203, a power generator 204, a heat-source medium amount adjusting device 214, a main steam control valve 215 and a steam turbine start-up control device (hereinafter referred to merely as a "start-up control device") 1. The explanation will be made in the embodiment by citing a case where the heat source device 201 is a gas turbine, namely, a case where the power plant 200 is a combined cycle power plant as an example.

In the heat source device 201, a low-temperature medium 206 (air to be burned with a fuel in the example) is heated by heat capacity held by a heat source medium 205 (fuels such as a gas fuel, a liquid fuel and a hydrogen containing fuel in the example), which is supplied to the steam generating device 202 as a high-temperature medium 207 (combustion gas having driven the gas turbine 201 in the example).

In the steam generating device 202 (an exhaust heat recovery boiler in the example), supplied water is heated by heat exchange with potential heat of the high-temperature medium 207 generated in the heat source device 201 to thereby generate a steam 208, and the steam turbine 203 is driven by the steam 208. The power generator 204 is coaxially connected to the steam turbine 203, and a rotational driving force of the steam turbine 203 is converted into electric power by the power generator 204. The generated power of the power generator 204 is outputted to, for example, a power system (not shown). A thermometer 213 is provided in the steam turbine 203, and a metal temperature of a casing in a first stage of the steam turbine 203 is measured by the thermometer 213.

The heat-source medium amount adjusting device 214 (a fuel regulating valve in the example) is provided in a supply route of the heat source medium 205 connecting to the heat source device 201, regulating the heat source medium amount to be supplied to the heat source device 201. The heat-source medium amount adjusting device 214 functions as an adjusting device which adjusts a plant load of the power plant 200. Also in the supply route of the heat source medium 205, a flowmeter 211 is provided on the downstream side of the heat-source medium amount adjusting device 214, and the supply amount of the heat source medium 205 supplied to the heat source device 201 is measured by the flowmeter 211.

The main steam control valve 215 is provided in a main steam pipe connecting the steam generating device 202 to the steam turbine 203, adjusting the flow rate of steam supplied to the steam turbine 203. The main steam control valve 215 functions as an adjusting device which adjusts a plant load of the power plant 200. Also in the main steam pipe, a pressure gauge 212 is provided in a position on the downstream side (steam turbine 203 side) of the main steam control valve 215, and the pressure of mainstream steam flowing in the main stream pipe is measured by the pressure gauge 212.

The start-up control device 1 includes a start-up control parameter storage unit 2, a start-up schedule calculation unit 3, a screen display unit 5, an instruction input unit 6, an equipment operation amount calculation unit 7 and an equipment state quantity acquisition unit 8.

The start-up control parameter storage unit 2 stores start-up patterns, start-up control parameters and constraint conditions.

The start-up schedule calculation unit 3 operates in accordance with an equipment state prediction program 4, calculating a current start-up schedule of the power plant 200 based on the start-up pattern, the start-up control parameters and the constraint condition stored in the start-up control parameter storage unit 2, and an equipment state quantity inputted from the equipment state quantity acquisition unit 8, and calculating a start-up schedule changing plan based on a constraint condition which is different from the constraint condition.

The screen display unit 5 displays respective start-up completion estimated times of the current start-up schedule and the start-up schedule changing plan calculated by the start-up schedule calculation unit 3.

The instruction input unit 6 outputs a switching instruction from the current start-up schedule to the start-up schedule changing plan to the start-up schedule calculation unit 3 in accordance with an input operation by an operator.

The equipment operation amount calculation unit 7 calculates operation amounts of plant equipment (hereinafter referred to as "equipment operation amounts") based on the current start-up schedule inputted by the start-up schedule calculation unit 3, and outputs control signals 11 corresponding to the equipment operation amounts to the plant equipment. The plant equipment in the embodiment includes the heat-source medium amount adjusting device 214 and the main steam control valve 215.

The equipment state quantity acquisition unit 8 converts measurement signals 12 inputted from plant instruments into an equipment state quantity and outputs the equipment state quantity to the start-up schedule calculation unit 3. The plant instruments in the embodiment include the flow meter 211 provided in the supply route of the heat source medium 205, the pressure gauge 212 provided in the main steam pipe connecting the steam generating device 202 and the steam turbine 203 and the thermometer 213 provided in the steam turbine 203.

Figure 2B:
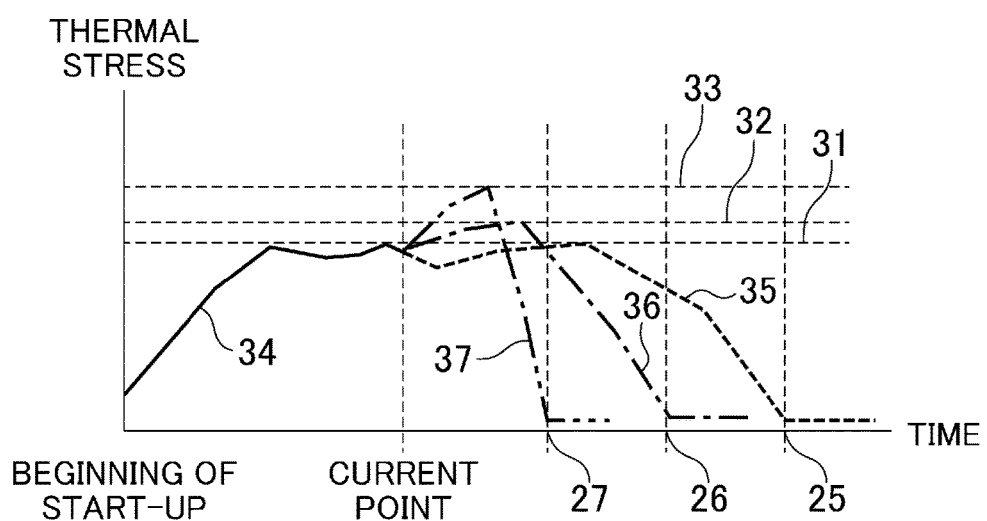

FIGS. 2A and 2B are graphs showing respective output curves and thermal stress curves of the current start-up schedule and the start-up schedule changing plans. An example of a case of using a thermal stress limiting value as a constraint condition will be explained below.

In FIGS. 2A and 2B, an output curve 21 and a thermal stress curve 34 shown by solid lines indicate results obtained when the current start-up schedule using a thermal stress limiting value 31 as a constraint condition is executed from the beginning of start-up to a current point, and an output curve 22 and a thermal stress curve 35 shown by dashed lines indicate predictions which are made when the current start-up schedule is executed from the current point to the start-up completion. An output curve 23 and a thermal stress curve 36 shown by long dashed short dashed lines indicate predictions which are made when a start-up schedule changing plan (hereinafter referred as a "start-up schedule changing plan A") using a thermal stress limiting value 32 as a constraint condition is executed from the current point to the start-up completion. An output curve 24 and a thermal stress curve 37 shown by long dashed double-short dashed lines indicate predictions which are made when a start-up schedule changing plan (hereinafter referred to as a "start-up schedule changing plan B") using a thermal stress limiting value 33 as a constraint condition is executed from the current point to the start-up completion.

In a case where the thermal stress limiting value 31 is maintained as the constraint condition (in the case where the current start-up schedule is continued) after the current point, the thermal stress is suppressed to the thermal stress limiting value 31 or lower as shown by the thermal stress curve 35, and the output of the power plant 200 is assumed to reach 100% (start-up is completed) at a start-up completion estimated time 25 as shown by the output curve 22.

On the other hand, in a case where the constraint condition is alleviated from the thermal stress limiting value 31 to the thermal stress limiting value 32 (in the case where the current start-up schedule is switched to the start-up schedule changing plan A) after the current point, the thermal stress is allowed until reaching the thermal stress limiting value 32 as shown by the thermal stress curve 36, and the output of the power plant 200 is assumed to reach 100% (start-up is completed) at a start-up completion estimated time 26 as shown by the output curve 23. In a case where the constraint condition is alleviated from the thermal stress limiting value 31 to the thermal stress limiting value 33 (in the case where the current start-up schedule is switched to the start-up schedule changing plan B), the thermal stress is allowed until reaching the thermal stress limiting value 33 as shown by the thermal stress curve 37, and the output of the power plant 200 is assumed to reach 100% (start-up is completed) at a start-up completion estimated time 27 as shown by the output curve 24. That is, the start-up control device 1 can move up the start-up completion estimated time by alleviating the constraint condition of the start-up schedule.

The start-up schedule calculation unit 3 incorporates the equipment state quantity at the current point into the calculation of the thermal stress curves 35 to 37 from the current point to the start-up completion, the output curves 22 to 24 and the start-up completion estimated times 25 to 27 from the current point to the start-up completion, thereby improving these accuracy.

In the embodiment, the start-up schedule calculation unit 3 calculates the current start-up schedule based on the thermal stress limiting value 31 and the equipment state quantity at the current point as well as calculates the start-up schedule changing plans A, B based on the thermal stress limiting values 32, 33 which are different from the thermal stress limiting value 31 and the equipment state quantity at the current point.

Here, as a simple method of setting the thermal stress limiting values 32, 33 of the start-up schedule changing plans A, B, it is possible to consider a method of setting values obtained by performing constant multiplication (for example, 1.1 times, 1.2 times) of the thermal stress limiting value 31 of the current start-up schedule as the thermal stress limiting values 32, 33. However, the embodiment adopts a method of setting times obtained by moving up the start-up completion estimated time 25 of the current start-up schedule by a predetermined period of time (for example, 10 minutes, 20 minutes) as the start-up completion estimated times 26, 27 of the start-up schedule changing plans A, B, and setting thermal stress peak values (σmax) of the start-up schedule changing plans A, B calculated based on the start-up completion estimated times 26, 27 as the thermal stress limiting values 32, 33. Accordingly, the operator can move up the start-up completion estimation time in a predetermined time unit (for example, in a unit of 10 minutes).

As a method of calculating the thermal stress limiting values 32, 33, it is difficult to generate a function of calculating the thermal stress limiting values 32, 33 backward from the start-up completion estimated times 26, 27, therefore, a method of repeating calculation of the start-up schedule changing plan by incrementing the thermal stress limiting value by a small fraction from the current thermal stress limiting value 31, and by setting the thermal stress limiting values in which the start-up completion estimated times correspond to the start-up completion estimated times 26, 27 as the thermal stress limiting values 32, 33 is used.

FIG. 3 is an image showing an example of a start-up schedule selection screen displayed on the screen display unit 5 according to the embodiment.

In FIG. 3, respective start-up completion estimated times of the current start-up schedule and the start-up schedule changing plans A, B and selection buttons 51, 52 for instructing switching from the current start-up schedule to respective start-up schedule changing plans A, B are displayed on a start-up schedule selection screen 5a. Although the configuration in which two start-up schedule changing plans are calculated is adopted in the embodiment, the present invention is not limited to this, and a configuration in which three or more start-up schedule changing plans are calculated may be adopted.

Figure 4:
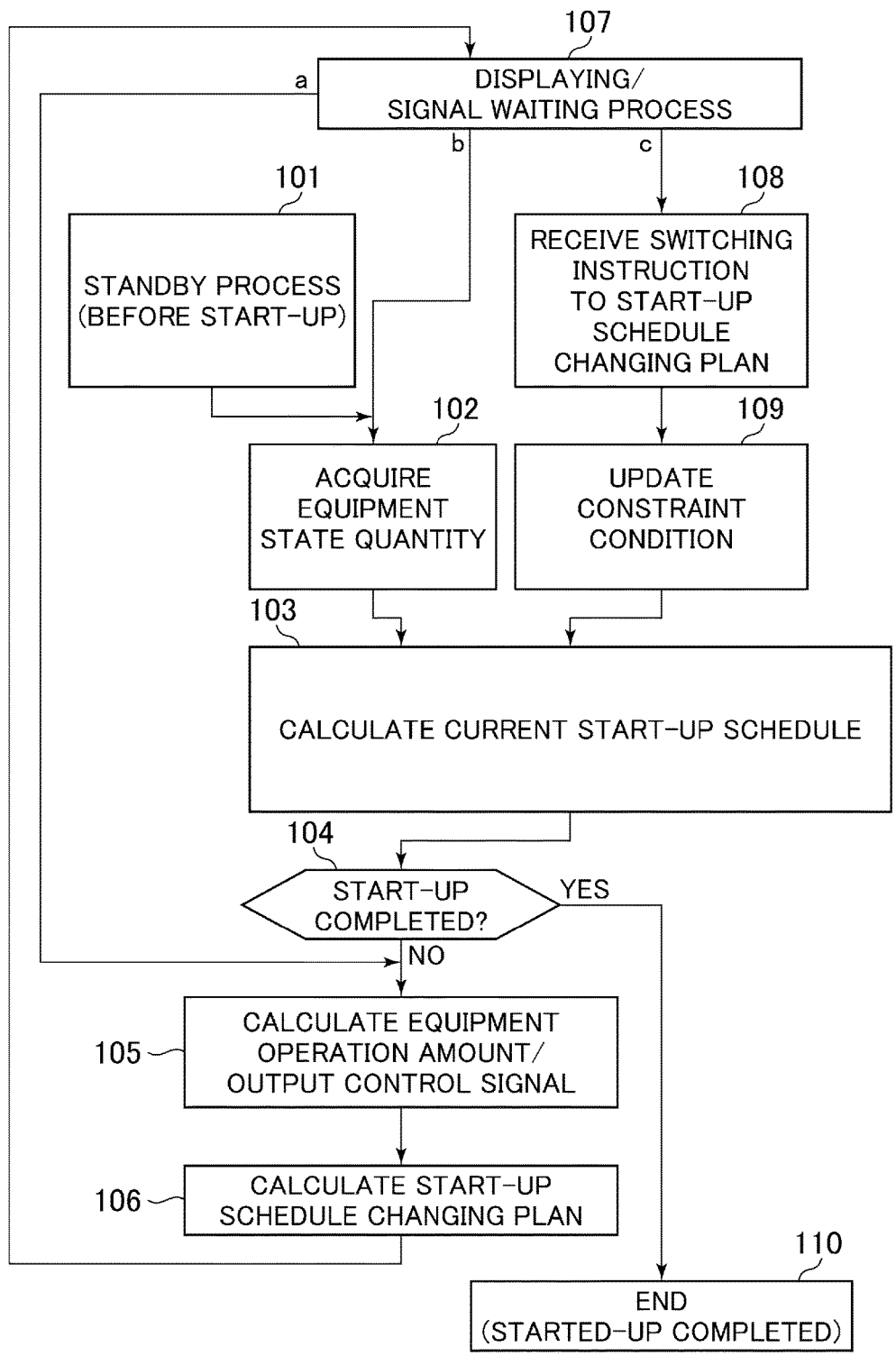
FIG. 4 is a chart showing an operation flow of the start-up control device according to the first embodiment of the present invention.

FIG. 4 is a chart showing an operation flow of the start-up control device 1.

In FIG. 4, when the start-up control device 1 receives an instruction for starting the plant during execution of a standby process (Step 101) before starting the plant, the start-up control device 1 acquires an equipment state quantity by the equipment state quantity acquisition unit 8 (Step 102) and calculates the current start-up schedule (including the start-up completion estimated time 25) by the start-up schedule calculation unit 3 (Step 103). Subsequent to Step 103, the start-up schedule calculation unit 3 determines whether the power plant 200 is in the start-up completion state or not based on the current start-up schedule and the equipment state quantity (Step 104).

When it is determined as Yes (the power plant 200 is in start-up completion state) in Step 104, the start-up control device 1 stops operation (Step 110).

On the other hand, when it is determined as No (the power plant 200 is not in start-up completion state) in Step 104, the equipment operation amount calculation unit 7 calculates equipment operation amounts and outputs the control signals 11 corresponding to the equipment operation amounts to the heat-source medium amount adjusting device 214 and the main steam control valve 215 (Step 105).

Subsequent to Step 105, the start-up schedule calculation unit 3 calculates the start-up schedule changing plans A, B (including the start-up completion estimated times 26, 27) based on constraint conditions (thermal stress limiting values 32, 33) different from the current constraint condition (thermal stress limiting value 31) and the equipment state quantity (Step 106).

Subsequent to Step 106, respective start-up completion estimated times 25 to 27 of the current start-up schedule and the start-up schedule changing plans A, B are displayed on the screen display unit 5 and a signal waiting process is executed (Step 107).

While the signal waiting process (Step 107) is executed, the process proceeds to Step 105 (route "a") at regular intervals which are previously set in consideration of the output timing of the control signals of the plant equipment (the heat-source medium amount adjusting device 214 and the main steam control valve 215), and processes after Step S105 are executed as described above.

Also while the signal waiting process (Step 107) is executed, the process proceeds to Step 102 (route "b") at regular intervals which are previously set in consideration of the measurement timing of the plant instruments 211 to 213, and processes after Step S102 are executed as described above.

When an input operation is performed on the instruction input unit 6 while the signal waiting process (Step 107) is executed, the process proceeds to Step 108 (route "c"), in which a switching instruction to the start-up schedule changing plan A or B is received (Step 108) and the constraint condition (the thermal stress limiting value 31) stored in the start-up control parameter storage unit 2 is updated by the constraint condition (thermal stress limiting values 32 or 33) corresponding to the stand-up schedule changing plan A or B to be switched (Step 109). Subsequent to Step S109, processes after Step 103 are executed as described above.

When the start-up control device 1 according to the embodiment is used, the stand-up schedule changing plans A, B are calculated based on the thermal stress limiting values 32, 33 which are set in accordance with desired start-up completion estimated times 26, 27 and the equipment state quantity at the current point, therefore, the start-up completion estimated time 25 can be changed to the desired start-up completion estimated time 26 or 27 simply and safely during the start-up of the power plant 200. Accordingly, the operator can flexibly deal with changes in power demand and the like during the start-up of the power plant 200.

Second Embodiment

Next, a second embodiment of the present invention will be explained.

The embodiment differs from the first embodiment in a point that lifetime consumption rates of a turbine rotor (not shown) provided in the steam turbine 203 (see FIG. 1) is displayed on the screen display unit 5 (see FIG. 1) with respect to the current start-up schedule and the start-up schedule changing plans A, B respectively.

FIG. 5 is an image showing an example of a start-up schedule selection screen displayed on the screen display unit 5 according to the embodiment.

In FIG. 5, respective start-up completion estimated times and lifetime consumption rates of the current start-up schedule and the start-up schedule changing plans A, B are displayed on the start-up schedule selection screen 5a.

A method of calculating the lifetime consumption rate will be explained below.

Figure 6:
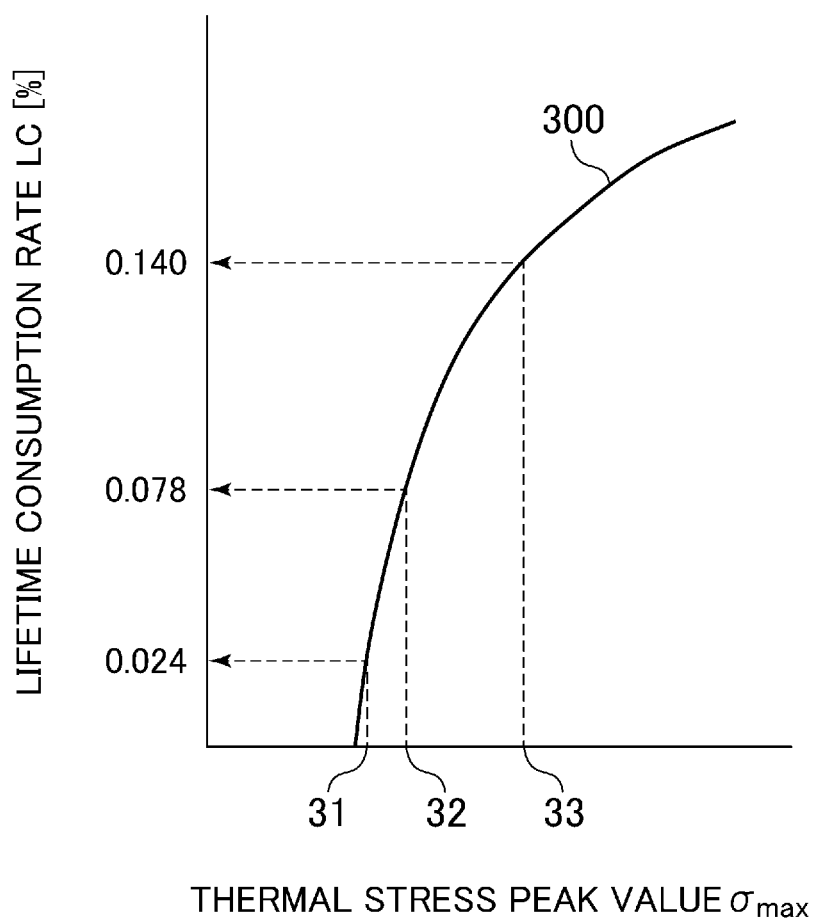
FIG. 6 is a graph showing the correlation between the maximum values of thermal stress generated in a turbine rotor and lifetime consumption rates of the turbine rotor.

FIG. 6 is a graph showing the correlation (hereinafter referred to as a "lifetime consumption rate curve") between the maximum values of the thermal stress (hereinafter referred to as "thermal stress peak values") generated during one start-up and lifetime consumption rates. The lifetime consumption rate mentioned here is an index indicating the reduction of the lifetime of the turbine rotor due to the thermal stress, which will be 100% when a crack can occur in the turbine rotor due to a low-cycle thermal fatigue generated due to the thermal stress.

In FIG. 6, a lifetime consumption rate curve 300 is created based on, for example, results of a low-cycle thermal fatigue test of a turbine rotor material, which is previously stored in the start-up control parameter storage unit 2. The start-up schedule calculation unit 3 regards the respective thermal stress limiting values 31 to 33 (see FIG. 2B) of the current start-up schedule and the start-up schedule changing plans A, B as the thermal stress peak values σmax, calculating lifetime consumption rates LC corresponding to the respective thermal stress limiting values 31 to 33 in the lifetime consumption rate curve 300.

When the start-up control device 1 according to the embodiment is used, the same advantages as those of the first embodiment can be obtained and the operator can determine whether the switching from the current start-up schedule to the start-up schedule changing plan A or B is executed or not by comparing and considering respective lifetime consumption rates of the current start-up schedule and the start-up schedule changing plans A, B.

Third Embodiment

Next, a third embodiment of the present invention will be explained.

The embodiment differs from the first embodiment in a point that the degree of influence on an annual operation plan of the power plant 200 is displayed on the screen display unit 5 (see FIG. 1) with respect to the current start-up schedule and the start-up schedule changing plans A, B respectively.

First, the annual operation plan of the power plant 200 will be explained.

In general, the start-up schedule of the power plant 200 is classified into either one of start-up modes such as a hot mode, a warm mode and a cold mode according to the stop time of the steam turbine 203 or the temperature inside the turbine rotor. The annual operation plan sets the lifetime consumption rate and the annual number of start-up times with respect to each start-up mode.

Next, a method of formulating the annual operation plan will be explained.

The starting time is increased in the order of the hot mode, the warm mode and the cold mode when comparing in the same thermal stress limiting value. Therefore, the thermal stress limiting value is set to be lower (set a planned value of the lifetime consumption rate to be smaller) in the hot mode in which a margin with respect to a required starting time is large, the thermal stress limiting value is set to be higher (set a planned value of the lifetime consumption rate to be larger) in the cold mode in which the margin with respect to the required starting time is small, and the annual number of start-up times in each start-up mode is adjusted, thereby formulating an effective annual operation plan in consideration of the balance between operating costs and the lifetime of the turbine rotor.

Specifically, the standard lifetime consumption rates in respective start-up modes (hereinafter referred to as "lifetime consumption rate planned values") are represented as Ahot, Awarm and Acold, and the planned numbers of start-up times in a current year in respective start-up modes (hereinafter referred to as "annual number of start-up times planned values") are represented by Bhot, Bwarm and Bcold. The annual number of start-up times planned values in respective start-up modes Bhot, Bwarm and Bcold are determined such that a product-sum value of the lifetime consumption rate planned values and the annual number of start-up times planned values Ahot×Bhot+Awarm×Bwarm+Acold×Bcold corresponds to the lifetime consumption rate allowed in the current year. The formulation of the annual operation plan as above has generally been performed.

The present invention assumes that the starting time is shortened by increasing the lifetime consumption rates to be larger than the lifetime consumption rate planned values Ahot, Awarm and Acold, therefore, the operator can review the lifetime consumption rate planned values Ahot, Awarm and Acold in respective start-up modes by displaying respective lifetime consumption rates of the current start-up schedule and the start-up schedule changing plans A, B as in the start-up schedule selection screen 5a (see FIG. 5) according to the second embodiment.

However, in the start-up schedule selection screen (see FIG. 5) according to the second embodiment, it is difficult to grasp the degree of influence on the annual operation plan (particularly, the annual numbers of start-up times in respective start-up modes Bhot, Bwarm and Bcold) as a result of increasing the lifetime consumption rate.

FIG. 7 is an image showing an example of a start-up schedule selection screen displayed on the screen display unit 5 according to the embodiment.

In FIG. 7, respective residual numbers of start-up times in the current start-up schedule and the start-up schedule changing plans A, B, excess lifetime consumption rates with respect to the residual numbers of start-up times, start-up completion planned times, the selection buttons 51, 52 for instructing switching to respective start-up schedule changing plans A, B and a start-up mode selection field 53 for selecting the start-up mode are displayed on the start-up schedule selection screen 5a. In the example shown in FIG. 7, the warm mode is selected as the start-up mode, and the residual number of start-up times and the excess lifetime consumption rate in the warm mode are displayed. When the hot mode or the cold mode is selected, the residual numbers of start-up times and the excess lifetime consumption rates of respective start-up modes can be displayed.

Hereinafter, a method of calculating the residual number of start-up times and the excess lifetime consumption rate will be explained by citing a case where the current start-up schedule belongs to the warm mode.

The start-up control parameter storage unit 2 previously stores the lifetime consumption rate planned values Ahot, Awarm and Acold in respective start-up modes and the annual number of start-up times planned values Bhot, Bwarm and Bcold in respective modes. Here, assume that the lifetime consumption rate planned value Awarm in the warm section is 0.024%, the annual number of start-up times planned value Bwarm in the warm mode is 16 times, and the start-up schedule in the warm mode in the past has been executed once with a lifetime consumption rate 0.025%. In this case, the current residual number of start-up times is calculated as 16 times−1 time=15 times, and the lifetime consumption rate planned value Awarm in the warm mode is 0.024%, therefore, the excess lifetime consumption rate in the past start-up schedule is calculated as 0.025%−0.024%=0.001% pt. Here, the lifetime consumption rate of the current start-up schedule corresponds to the lifetime consumption rate planned value Awarm (0.024%) in the warm mode if any change is not made, therefore, the excess lifetime consumption rate in the current start-up schedule is calculated as 0.024%−Awarm(=0.024%)=0.000% pt. When the excess lifetime consumption rate in the past 0.001% pt is added to the above, the current excess lifetime consumption rate will be 0.001% pt. As a result, "15" which is the residual number of start-up times in the current start-up schedule, and "0.001" which is the excess lifetime consumption rate with respect to 15 times as residual number of start-up times are displayed on the start-up schedule selection screen 5a.

Subsequently, the residual number of start-up times and the excess lifetime consumption rate of the start-up schedule changing plan A are calculated. Here, when the lifetime consumption rate of the start-up schedule changing plan A is 0.045%, the excess lifetime consumption rate of the start-up schedule changing plan A is calculated as 0.045%−Awarm (=0.024%)=0.021% pt. When 0.001% pt as the excess lifetime consumption rate in the past is added to the above, the excess lifetime consumption rate with respect to 15 times as the residual number of start-up times in the case of being switched to the start-up schedule changing plan A will be 0.022% pt. As a result, "15" which is the residual number of start-up times in the start-up schedule changing plan A, and "0.022" which is the excess lifetime consumption rate with respect to 1.5 times as residual number of start-up times are displayed on the start-up schedule selection screen 5a.

Subsequently, the residual number of start-up times and the excess lifetime consumption rate of the start-up schedule changing plan B are calculated. Here, when the lifetime consumption rate of the start-up schedule changing plan B is 0.049%, the excess lifetime consumption rate of the start-up schedule changing plan B is calculated as 0.049%−Awarm (=0.024%)=0.025% pt. When 0.001% pt as the excess lifetime consumption rate in the past is added to the above, the excess lifetime consumption rate with respect to 15 times as the residual number of start-up times in the case of being switched to the start-up schedule changing plan B is calculated as 0.026% pt. In the case where the excess lifetime consumption rate (0.026% pt) exceeds the lifetime consumption rate planned value Awarm (=0.024%) per one start-up as in the above case, one time is subtracted from the residual number of start-up times (15 times) and the lifetime consumption rate planned value Awarm (=0.024%) per one start-up is subtracted from the excess lifetime consumption rate (0.026% pt), thereby correcting the values respectively. As a result, "14" which is the residual number of start-up times after being switched to the start-up schedule changing plan B, and "0.002" which is the excess lifetime consumption rate with respect to 14 times as residual number of start-up times are displayed on the start-up schedule selection screen 5a. Accordingly, the operator can correctly grasp the residual number of start-up times and the excess lifetime consumption rate with respect to the residual number of start-up times even when the excess lifetime consumption rate exceeds the lifetime consumption rate planned value per one start-up.

When the start-up control device 1 according to the embodiment is used, the same advantages as those of the first embodiment can be obtained and the operator can determine whether the switching from the current start-up schedule to the start-up schedule changing plan A or B is executed or not by comparing and considering the degree of influence on respective annual operation plans of the current start-up schedule and the start-up schedule changing plans A, B (the residual number of start-up times and the excess lifetime consumption rate with respect to the residual number of start-up times).

Fourth Embodiment

Next, a fourth embodiment of the present invention will be explained.

The embodiment differs from the first embodiment in a point that fuel consumption amounts to be used until the start-up completion are displayed on the screen display unit 5 (see FIG. 1) with respect to respective current start-up schedule and the start-up schedule changing plans A, B.

FIG. 8 is an image showing an example of a start-up schedule selection screen displayed on the screen display unit 5 according to the embodiment.

In FIG. 8, fuel consumption amounts of the current start-up schedule and the start-up schedule changing plans A, B to be used until the start-up completion are displayed on the start-up schedule selection screen 5a.

When the start-up control device 1 according to the embodiment is used, the same advantages as those of the first embodiment can be obtained and the operator can determine whether the switching from the current start-up schedule to the start-up schedule changing plan A or B is executed or not by comparing and considering respective fuel consumption amounts to be used until the start-up completion in the current start-up schedule and the start-up schedule changing plans A, B.

Fifth Embodiment

Next, a fifth embodiment of the present invention will be explained.

The embodiment differs from the first embodiment in a point that respective output curves and the thermal stress curves of the current start-up schedule and the start-up schedule changing plans A, B are displayed on the screen display unit 5 (see FIG. 1).

Figure 9:
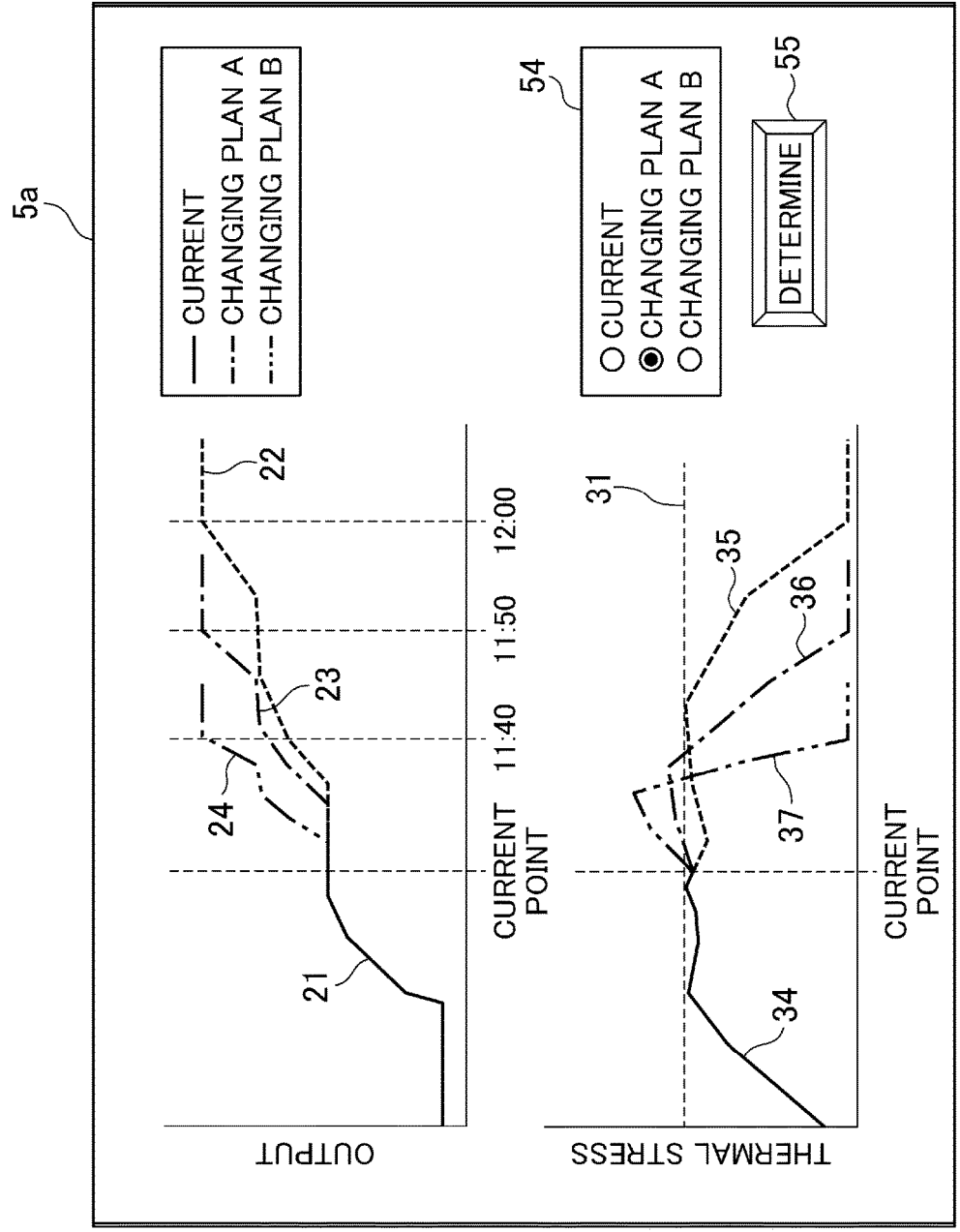
FIG. 9 is an image showing an example of a start-up schedule selection screen displayed on the screen display unit according to a fifth embodiment of the present invention.

FIG. 9 is an image showing an example of a start-up schedule selection screen displayed on the screen display unit 5 according to the embodiment.

In FIG. 9, the output curve 21 and the thermal stress curve 34 from the beginning of starting to the current point, the output curve 22 and the thermal stress curve 35 from the current point to the start-up completion in the current start-up schedule, the output curve 23 and the thermal stress curve 36 from the current point to the start-up completion in the start-up schedule changing plan A, the output curve 24 and the thermal stress curve 37 from the current point to the start-up completion in the start-up schedule changing plan B, a limiting line indicating the thermal stress limiting value 31 of the current start-up schedule, a start-up schedule selection field 54 for selecting the start-up schedule to be switched and a determination button 55 for instructing the switching to the start-up schedule selected in the start-up schedule selection field 54 are displayed on the start-up schedule selection screen 5a.

When the start-up control device 1 according to the embodiment is used, the same advantages as those of the first embodiment can be obtained and the operator can determine whether the switching from the current start-up schedule to the start-up schedule changing plan A or B is executed or not by comparing and considering respective output curves 22 to 24 and the thermal stress curves 35 to 37 in the current start-up schedule and the start-up schedule changing plans A, B.

Sixth Embodiment

Next, a sixth embodiment according to the present invention will be explained.

The embodiment differs from the first embodiment in a point that the constraint condition of the start-up schedule changing plan is designated by the operator, which is not set by the start-up schedule calculation unit 3 based on a predetermined calculation formula.

Figure 10:
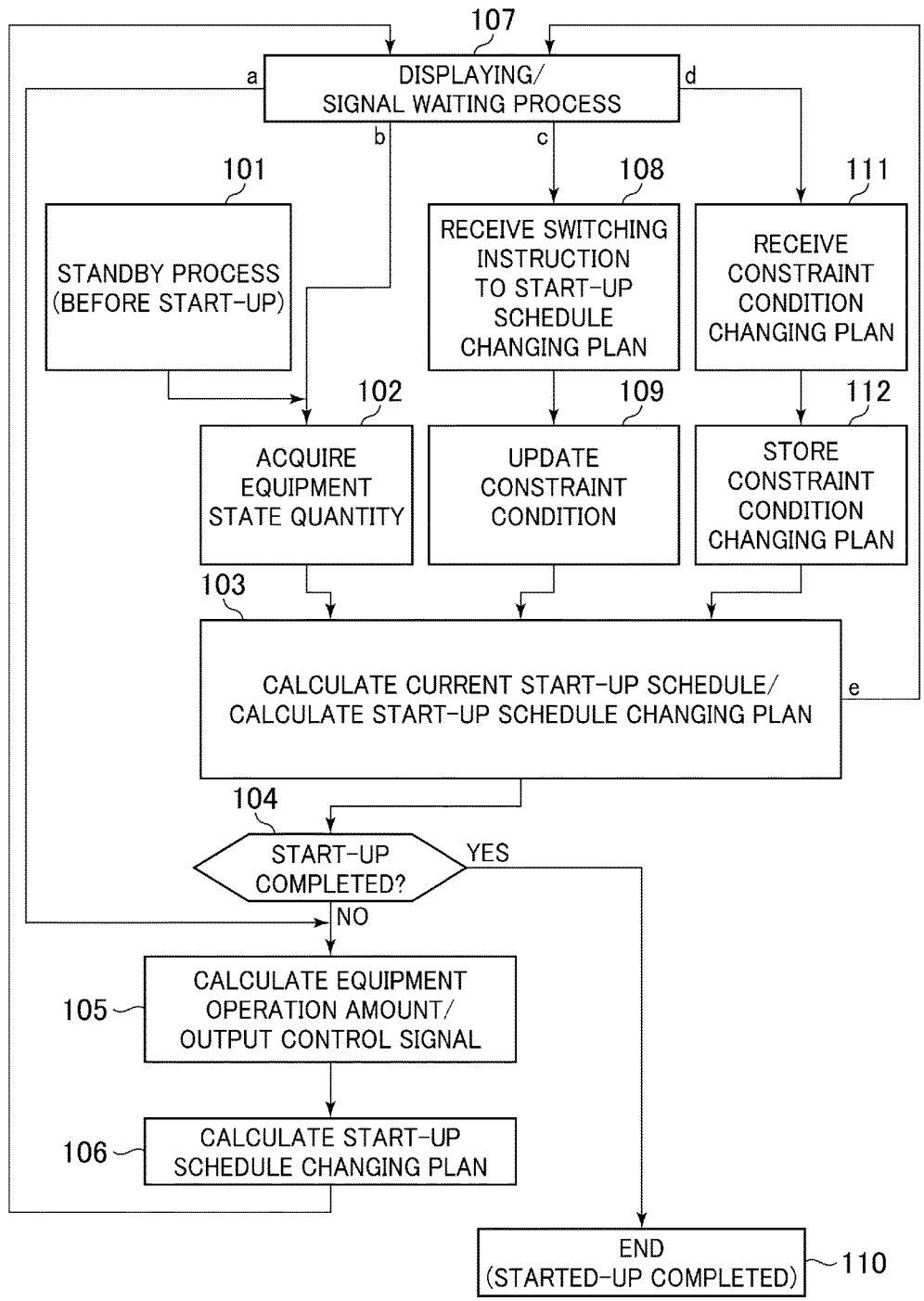
FIG. 10 is a chart showing an operation flow of the start-up control device according to a sixth embodiment of the present invention.

FIG. 10 is a chart showing an operation flow of the start-up control device 1 according to the embodiment.

In FIG. 10, when the constraint condition is designated through an operation on the instruction input unit 6 and calculation of the start-up schedule changing plan is instructed (route "d") during execution of a signal waiting process (Step 107), the constraint condition is received in the start-up schedule calculation unit 3 (Step 111) and stored in the start-up control parameter storage unit 2 (Step 112). Subsequent to Step 112, the start-up schedule changing plan is calculated (Step 103). Subsequent to Step S103, the process proceeds to Step 107 (route "e"), and processes after Step 107 are executed as described above.

Figure 11:
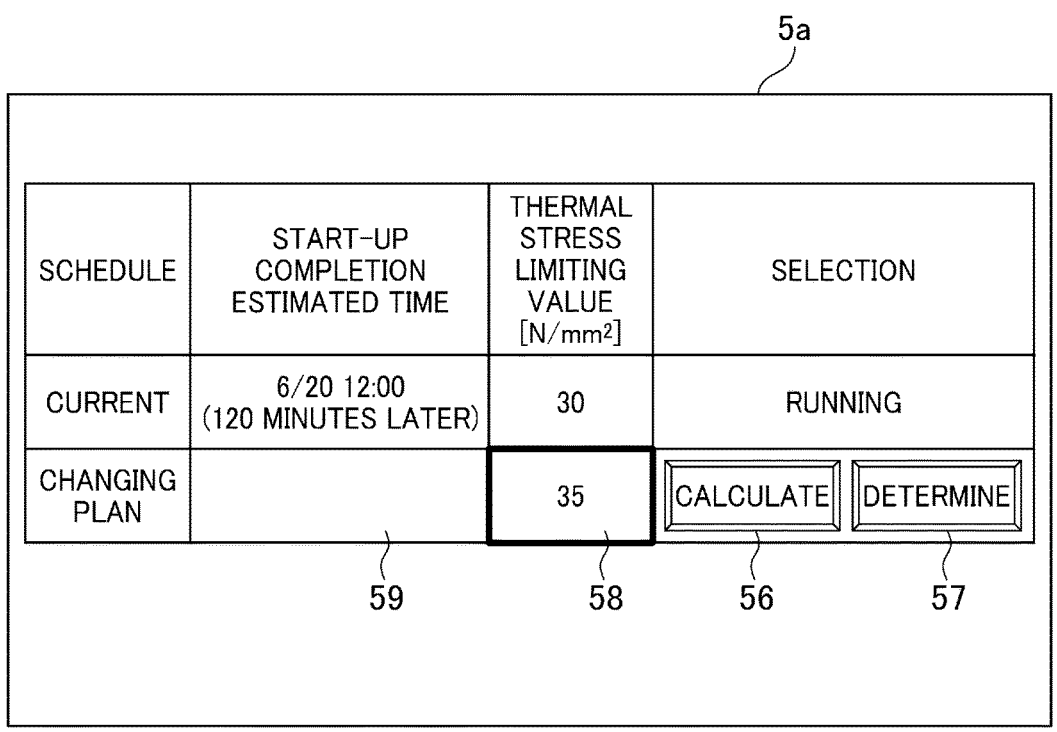
FIG. 11 is an image showing an example of a start-up schedule selection screen (before calculating the start-up schedule changing plan) displayed on the screen display unit according to the sixth embodiment of the present invention.

FIG. 11 is an image showing an example of a start-up schedule selection screen displayed on the screen display unit 5 according to the embodiment.

In FIG. 11, respective start-up completion estimated times and thermal stress limiting values of the current start-up schedule and the start-up schedule changing plan, a calculation button 56 for instructing the start-up schedule calculation unit 3 to calculate the start-up schedule changing plan and a determination button 57 for instructing the start-up schedule calculation unit 3 to perform switching to the start-up schedule changing plan are displayed on the start-up schedule selection screen 5a.

On a thermal stress limiting value input field 58, the thermal stress limiting value of the start-up schedule changing plan inputted through the operation on the instruction input unit 6 is displayed. On a start-up completion estimated time display field 59, the start-up completion estimated time of the start-up schedule changing plan is to be displayed, however, nothing is displayed before the start-up schedule changing plan is calculated. When the calculation button 56 is clicked or tapped after the thermal stress limiting value is inputted in the thermal stress limiting value input field 58, the start-up schedule changing plan is calculated, and the start-up completion estimated time of the start-up schedule changing plan is displayed on the start-up completion estimated time display field 59 as shown in FIG. 12. After that, when the determination button 57 is clicked or tapped, the current start-up schedule is switched to the start-up schedule changing plan.

Here, when a time lag occurs until the determination button 57 is operated from the operation on the calculation button 56, the equipment state quantity varies during the time lag, which may cause a significant error in the start-up completion estimated time.

Accordingly, the determination button 57 can be configured so as to be operated only during a predetermined period of time (for example, for five minutes) from the completion of calculation of the start-up schedule changing plan (after the transition from Step 103 to Step 107 in FIG. 10) and so as not to be operated after the predetermined period of time passes. According to the configuration, the start-up schedule changing plan has to be calculated again based on the equipment state quantity of the current point after the predetermined period of time passes from the calculation of the start-up schedule changing plan, therefore, the occurrence of the time lag from the timing of calculation completion of the start-up schedule changing plan to the timing of switching of the start-up schedule can be prevented.

When the start-up control device 1 according to the embodiment is used, not only the same advantages as those of the first embodiment can be obtained but also the start-up schedule changing plan is calculated based on the constraint condition designated by the operator and the operator can determine whether the switching from the current start-up schedule to the start-up schedule changing plan A or B is executed or not by comparing and considering respective start-up completion estimated times in the current start-up schedule and the start-up schedule changing plan.

Seventh Embodiment

Next, a seventh embodiment of the present invention will be explained.

The embodiment corresponds to an embodiment in which the constraint condition of the start-up schedule changing plan is replaced with the start-up completion estimated time of the start-up schedule changing plan as the item designated by the operator in the sixth embodiment.

Hereinafter, explanation will be made by focusing on a point different from the sixth embodiment.

Figure 13:
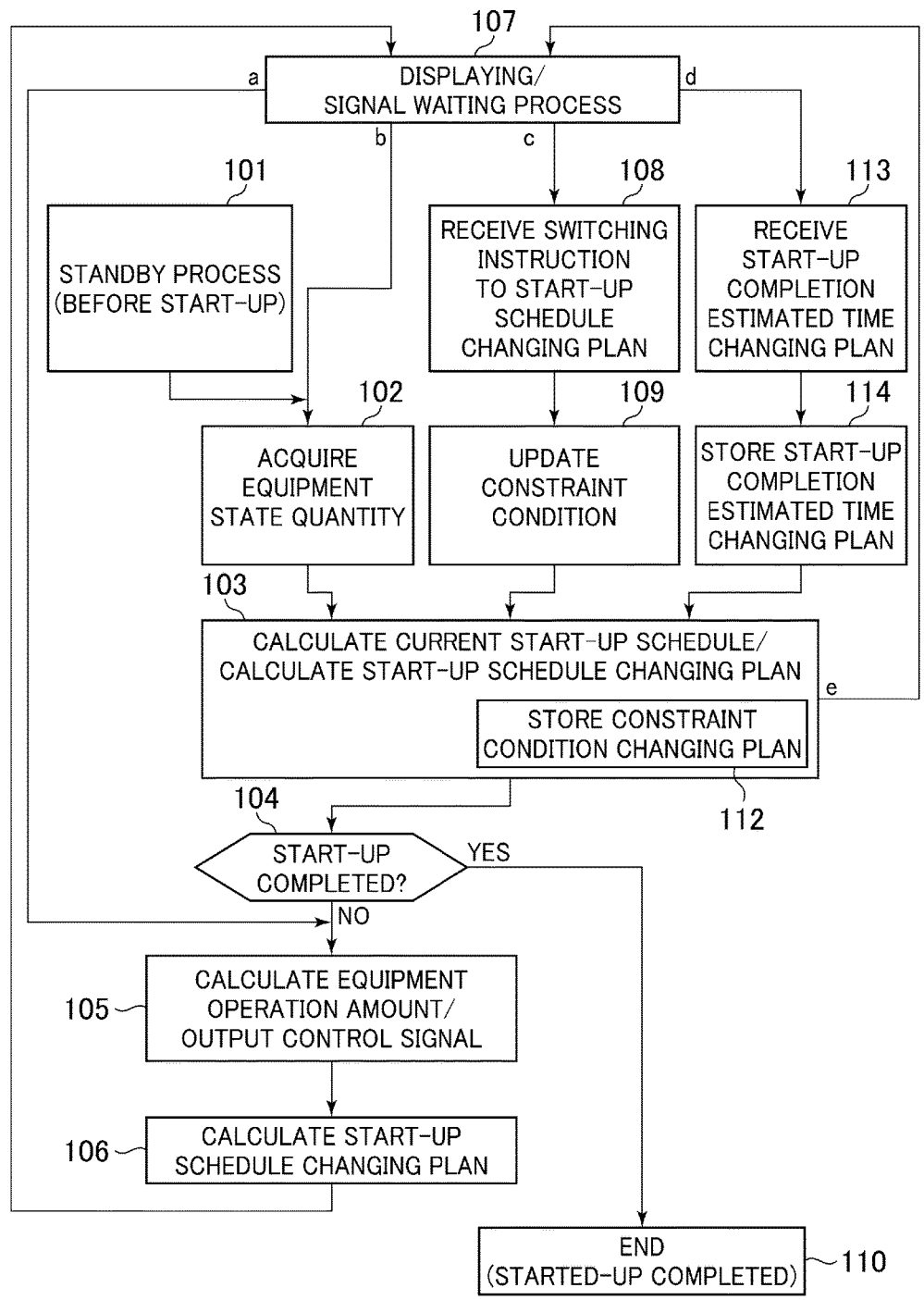
FIG. 13 is a chart showing an operation flow of the start-up control device according to a seventh embodiment of the present invention.

FIG. 13 is a chart showing an operation flow of the start-up control device 1 according to the embodiment.

In FIG. 13, when the start-up completion estimated time is inputted through the operation on the instruction input unit 6 and calculation of the start-up schedule changing plan is instructed (route "d") during execution of the signal waiting process (Step 107), the start-up completion estimated time is received in the start-up schedule calculation unit 3 (Step 113) and stored in the start-up control parameter storage unit 2 (Step 114). Subsequently, the current start-up schedule is calculated based on the equipment state quantity and the current constraint condition and the start-up schedule changing plan is calculated based on the equipment state quantity at the current point and the designated start-up completion estimated time (Step 103). At this time, the constraint condition of the start-up schedule changing plan is calculated and stored in the start-up control parameter storage unit 2 (Step 112). Subsequent to Step 112, the process proceeds to Step S107 (route "e"), and processes after Step S107 are executed as described above.

FIG. 14 is an image showing an example of a start-up schedule selection screen displayed on the screen display unit 5 according to the embodiment.

In FIG. 14, respective start-up completion estimated times and lifetime consumption rates of the current start-up schedule and the start-up schedule changing plan, the calculation button 56 for instructing the start-up schedule calculation unit 3 to calculate the start-up schedule changing plan and the determination button 57 for instructing the start-up schedule calculation unit 3 to perform switching to the start-up schedule changing plan are displayed on the start-up schedule selection screen 5a.

On a start-up completion estimated time input field 60, the start-up completion estimated time inputted through the operation on the instruction input unit 6 is displayed. On a lifetime consumption rate display field 61, the lifetime consumption rate of the start-up schedule changing plan is to be displayed, however, nothing is displayed before the start-up schedule changing plan is calculated. When the calculation button 56 is clicked or tapped after the start-up completion estimated time is inputted in the start-up completion estimated time input field 60, the start-up schedule changing plan is calculated, and the lifetime consumption rate of the start-up schedule changing plan is displayed on the lifetime consumption rate display field 61 as shown in FIG. 15. After that, when the determination button 57 is clicked or tapped, the current start-up schedule is switched to the start-up schedule changing plan.

When the start-up control device 1 according to the embodiment is used, not only the same advantages as those of the first embodiment can be obtained but also the start-up schedule changing plan is calculated based on the start-up completion estimated time designated by the operator and the operator can determine whether the switching from the current start-up schedule to the start-up schedule changing plan is executed or not by comparing and considering respective lifetime consumption rates of the current start-up schedule and the start-up schedule changing plan.

The present invention is not limited to the above embodiments but includes various modification examples. For example, the above embodiments have been explained in detail for explaining the present invention to be easily understood, and the present invention is not limited to the embodiments having all the components explained above. It is possible to replace part of components of a certain embodiment with components of another embodiment, or it is possible to add a component of another embodiment to components of a certain embodiment.

The above embodiments are suitable for start-up control of a combined cycle power plant, however, the present invention is not limited to this and can be applied to a nuclear power plant, a co-generation plant using fossil fuels and industrial plants requiring time for starting a boiler and so on.

What is claimed is:

1. A start-up control device for a power plant including a steam turbine, comprising:
   a processor;
   a memory storing a program which, when executed, causes the processor to:
   receive measurement signals from instruments arranged in the power plant and convert the measurement signals to an equipment state quantity of the power plant;
   calculate a running start-up schedule from a current point to a start-up completion based on the equipment state quantity and a predetermined first constraint condition and calculate a start-up schedule changing plan from the current point to the start-up completion based on the equipment state quantity and a predetermined second constraint condition; and
   calculate an equipment operation amount of the power plant based on the running start-up schedule;
   a display screen that displays start-up completion estimated times with respect to a case when the running start-up schedule is executed from the current point to the start-up completion and a case when the start-up schedule changing plan is executed from the current point to the start-up completion, respectively; and
   a user interface through which an operator inputs an instruction for switching from the running start-up schedule to the start-up schedule changing plan.

2. The start-up control device for the power plant according to claim 1,
   wherein the display screen further displays lifetime consumption rates that are degrees of low-cycle thermal fatigue accumulated in a turbine rotor provided in the steam turbine with respect to the case when the running start-up schedule is executed from the current point to the start-up completion and the case when the start-up schedule changing plan is executed from the current point to the start-up completion, respectively.

3. The start-up control device for the power plant according to claim 1,
   wherein the display screen further displays fuel consumption amounts to be used until the start-up completion with respect to the case when the running start-up schedule is executed from the current point to the start-up completion and the case when the start-up schedule changing plan is executed from the current point to the start-up completion, respectively.

4. The start-up control device for the power plant according to claim 1,
   wherein the display screen further displays the residual numbers of start-up times in a current year and excess lifetime consumption rates for the residual numbers of start-up times with respect to the case when the running start-up schedule is executed from the current point to the start-up completion and the case when the start-up schedule changing plan is executed from the current point to the start-up completion, respectively.

5. The start-up control device for the power plant according to claim 1,
   wherein the display screen further displays output curves of the steam turbine with respect to the case when the running start-up schedule is executed from the current point to the start-up completion and the case when the start-up schedule changing plan is executed from the current point to the start-up completion, respectively.

6. The start-up control device for the power plant according to claim 1,
   wherein the second constraint condition is set through an input operation on the user interface.

7. The start-up control device for the power plant according to claim 1,
   wherein the user interface sets a predetermined start-up completion estimated time in accordance with an input operation by the operator, and
   the second constraint condition is calculated based on the predetermined start-up completion estimated time.

8. A start-up control method for a power plant including a steam turbine, the method comprising:
   receiving measurement signals from instruments arranged in the power plant;
   converting the measurement signals to an equipment state quantity of the power plant;
   calculating a running start-up schedule from a current point to a start-up completion based on the equipment state quantity and a predetermined first constraint condition and calculating a start-up schedule changing plan from the current point to a start-up completion based on the equipment state quantity and a predetermined second constraint condition;
   calculating an equipment operation amount of the power plant based on the running start-up schedule;
   displaying start-up completion estimated times on a display screen with respect to a case when the running start-up schedule is executed from the current point to the start-up completion and a case when the start-up schedule changing plan is executed from the current point to the start-up completion, respectively; and
   receiving an instruction from an operator, via a user interface, for switching from the running start-up schedule to the start-up schedule changing plan; and
   switching from the running start-up schedule to the start-up schedule changing plan based on the instruction from the operator.

9. The start-up control method for the power plant according to claim 8,
   wherein lifetime consumption rates that are degrees of low-cycle thermal fatigue accumulated in a turbine rotor provided in the steam turbine are further displayed on the display screen with respect to the case when the running start-up schedule is executed from the current point to the start-up completion and the case when the start-up schedule changing plan is executed from the current point to the start-up completion, respectively.

10. The start-up control method for the power plant according to claim 8,
wherein fuel consumption amounts to be used until the start-up completion are further displayed on the display screen with respect to the case when the running start-up schedule is executed from the current point to the start-up completion and the case when the start-up schedule changing plan is executed from the current point to the start-up completion, respectively.

11. The start-up control method for the power plant according to claim 8,
wherein residual numbers of start-up times in a current year and excess lifetime consumption rates for the residual numbers of start-up times are further displayed on the display screen with respect to the case when the running start-up schedule is executed from the current point to the start-up completion and the case when the start-up schedule changing plan is executed from the current point to the start-up completion, respectively.

12. The start-up control method for the power plant according to claim 8,
wherein output curves of the steam turbine are further displayed on the display screen with respect to the case when the running start-up schedule is executed from the current point to the start-up completion start-up schedule and the case when the start-up schedule changing plan is executed from the current point to the start-up completion, respectively.

13. The start-up control method for the power plant according to claim 8,
wherein the second constraint condition is set through an input operation on the user interface.

14. The start-up control method for the power plant according to claim 8,
wherein a predetermined start-up completion estimated time is set through an input operation on the user interface, and
the second constraint condition is calculated based on the predetermined start-up completion estimated time.

\* \* \* \* \*